UNITED STATES PATENT OFFICE.

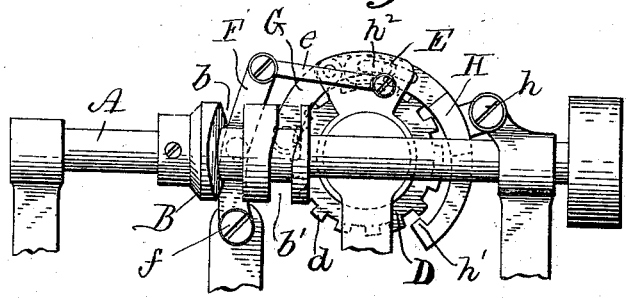
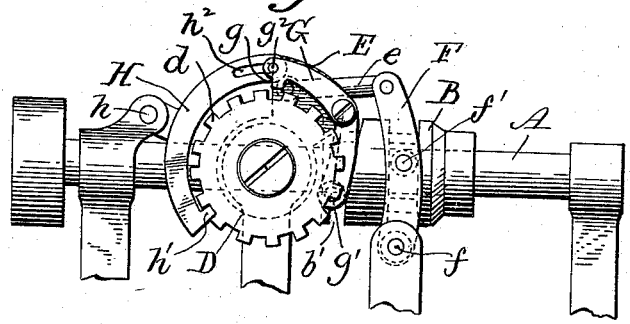
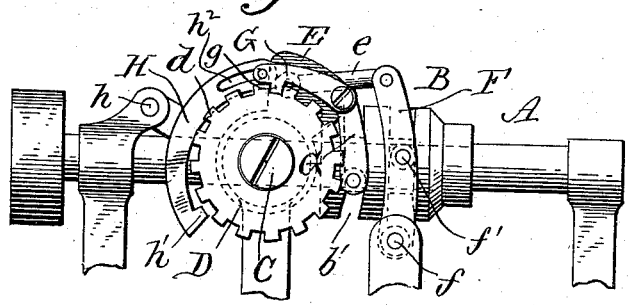
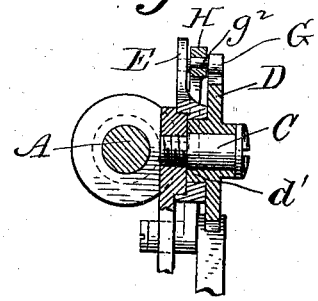

CHRISTIAN FRIEDERICH, OF ELIZABETH, NEW JERSEY, ASSIGNOR TO THE SINGER MANUFACTURING COMPANY, OF NEW JERSEY.

MECHANICAL MOVEMENT.

SPECIFICATION forming part of Letters Patent No. 545,883, dated September 10, 1895.

Application filed June 27, 1894. Serial No. 515,880. (No model.)

*To all whom it may concern:*

Be it known that I, CHRISTIAN FRIEDERICH, a citizen of the United States, residing at Elizabeth, in the county of Union and State of New Jersey, have invented certain new and useful Improvements in Mechanical Movements, of which the following is a specification, reference being had therein to the accompanying drawings.

My invention has for its object to provide an improved mechanism by means of which an intermittent rotating movement may be imparted to a toothed wheel from a continuously-rotating shaft, said toothed wheel being utilized to intermittingly rotate a shaft or cam, and said wheel being operated in such a manner that it will always be positively held, either by a locking-dog or by its operating-dog, so that it cannot be moved except as desired, the teeth of the said wheel and the operating-dog co-operating therewith being of such construction that the wheel may be turned in either direction, so that its direction of rotation may be reversed if the direction of rotation of the operating-shaft be reversed.

In carrying my invention into effect I provide a continuously-rotating operating-shaft with two cams, one of which is utilized to operate a swinging sector or lever, which carries a pivoted dog or lever having a tooth for engagement with the teeth of the wheel, the latter being preferably mounted at right angles to the said operating-shaft, and the other of said cams engaging a pin on the operating-dog to impart a vibrating movement thereto to cause its actuating-tooth to be engaged with or disengaged from the teeth of the wheel. Coacting with said operating-dog is a holding-dog pivoted in such a manner that its teeth may be engaged with or disengaged from the teeth of the wheel, said holding-dog being preferably actuated by the said operating-dog and in such a manner that as the tooth of the latter is moved into engagement with the teeth of the wheel the tooth of the holding-dog will be lifted from engagement with the teeth of the said wheel, and vice versa.

My invention may be used in any machine where it is desired to intermittingly rotate a wheel or shaft from a continuously-rotating shaft and to turn said intermittingly-rotating wheel or shaft either forward or backward, according to the direction of rotation of the rotating driving-shaft, thereby keeping the parts operated by the intermittingly-rotating wheel or shaft in proper time with the other parts of the machine and preventing them from being thrown out of time should the machine accidentally be turned backward.

My invention is especially intended for use with fancy-stitch sewing or embroidering machines, but of course may be employed in any other class of machines for which it is adapted.

In the accompanying drawings, Figures 1 and 2 are opposite side views of a mechanism embodying my invention. Fig. 3 is a view similar to Fig. 2, but with some of the parts in different positions. Fig. 4 is a cross-section through the center of the toothed wheel.

A denotes a continuously-rotating shaft provided with a cylinder B, having two cam-grooves $b$ and $b'$. Mounted on a stud C, in the form of my invention herein shown, is a wheel D, provided at its periphery with a series of rectangular teeth $d$. Mounted on the hub $d'$ of the wheel D is a swinging lever or sector E, connected by a link $e$ with a lever F, pivoted at $f$ and provided with a pin $f'$, engaging the cam-groove $b$ of the cam-cylinder B.

G is the operating-dog pivotally mounted on the lever or sector E, said dog being provided at one end with a rectangular tooth $g$ and at its opposite end with a pin $g'$, entering the cam-groove $b'$.

H denotes a holding-dog, pivoted at $h$ to a stationary part of the frame and provided at one end with a rectangular tooth $h'$ to enter between the teeth of the wheel D and having at its opposite end a slot $h^2$, entered by a pin $g^2$ on the operating-dog G.

With the parts constructed as above described, when the shaft A is set in motion the operating-dog G, carried by the swinging sector or lever E, will be vibrated by the cam-groove $b'$ on its pivot, so that its tooth $g$ will be alternately engaged with and disengaged from the teeth of the wheel D. When the said tooth $d$ is in engagement with the teeth of the wheel D, the swinging sector or lever E will be moved, carrying the dog G bodily with it and thus causing said dog to turn the said wheel to the extent of one tooth, the holding-dog H being at this time disengaged from the teeth of the said wheel; but before the return movement of the swinging sector commences the dog G will be turned on its pivot by the cam-groove $b'$ to disengage its tooth from the teeth of said wheel D, and as the said dog is thus disengaged from the wheel D its vibrating movement on its pivot will, by reason of the pin-and-slot connection of the said dog G with the holding-dog H, cause the tooth of the said holding-dog to be engaged with the teeth of the wheel D, and thus said wheel will be positively held at all times either by the holding-dog or the operating-dog, and any overthrowing of the said wheel will thus be effectively prevented. If the movements of the shaft A be reversed, the movements of the operating and holding dogs will also be reversed, so that the wheel D will be positively moved in either direction according to the direction in which the shaft A is rotated, and it will therefore be impossible for the wheel D to get out of timing with the shaft A, or for two mechanisms, one of which is operated from the shaft A and the other from the wheel D, to get out of timing with each other by any overthrowing of the wheel D or by turning the shaft A backward, as is liable to occur with the use of an ordinary pawl-and-ratchet mechanism for operating the wheel D.

Although I prefer to actuate the holding-dog H from the operating-dog G by means of the pin-and-slot connection of these parts herein shown, I do not wish to be understood as confining my invention to this connected operation of the said dogs, as it is obvious that the holding-dog H might be operated by an independent cam without departing from the spirit of my invention.

Having thus described my invention, I claim and desire to secure by Letters Patent—

1. The combination with a continuously rotating shaft, as A, provided with two cams, of a wheel to be intermittingly rotated, and which is provided with square or rectangular teeth, a moving device or lever, a pivoted operating dog carried thereby, connections between said cams and said moving device or lever and the said pivoted operating dog, whereby said device or lever will be moved to rotate said wheel in either direction and said dog will be vibrated on its pivotal point by positive movements in both directions to cause its tooth to be alternately engaged with and disengaged from the teeth of the said wheel, a holding dog having a tooth for engagement with the teeth of the said wheel, and means for positively operating said holding dog in both directions and so that its tooth will be in engagement with the wheel when the tooth of the operating dog is disengaged, and vice versa.

2. The combination with the rotating shaft A provided with the cylinder B having the cam grooves $b$ and $b'$, of the toothed wheel D, the swinging sector or lever E, the lever F operated by the cam groove $b$, the link $e$ connecting said lever with the said swinging sector or lever E, the pivoted operating dog G having at one end a tooth for engagement with the teeth of said wheel, and having at its opposite end a pin for engagement with the said cam groove $b'$, the holding dog H having a tooth for engagement with the teeth of said wheel, and means for operating said holding dog so that its tooth will be in engagement with the said wheel when the tooth of the operating dog is disengaged, and vice versa.

3. The combination with the shaft A provided with the cylinder B having the cam grooves $b$ and $b'$, of the toothed wheel D, the swinging sector or lever E, the lever F operated by the cam groove $b$, the link $e$ connecting said lever with the said swinging sector or lever, E, the pivoted operating dog G having at one end a tooth for engagement with the teeth of said wheel, and on the opposite side of its pivot a pin for engagement with the cam groove $b'$, and the holding dog having a tooth for engagement with the teeth of the said wheel, and having a slot and pin connection with the said operating dog.

In testimony whereof I affix my signature in presence of two witnesses.

CHRISTIAN FRIEDERICH.

Witnesses:
L. B. MILLER,
J. G. GREENE.